Figures 13, 14:
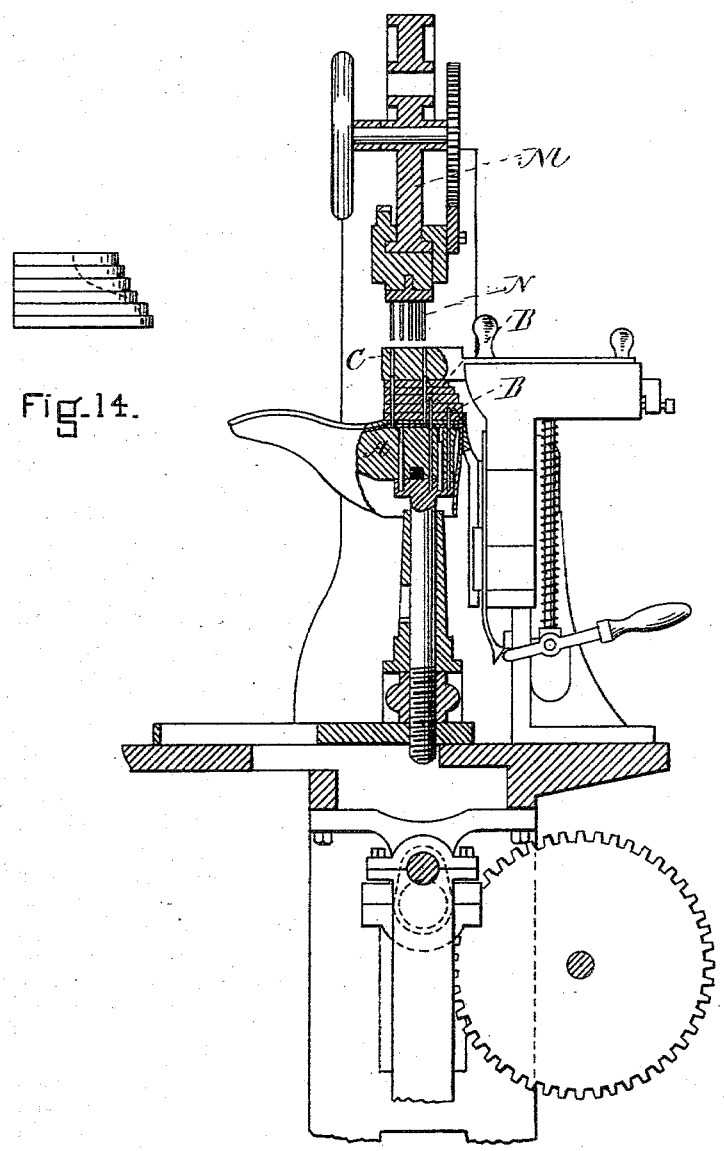

(No Model.) 4 Sheets—Sheet 1.
F. F. RAYMOND, 2d. & J. E. WHEELER.
HEEL NAILING MACHINE.
No. 280,861. Patented July 10, 1883.
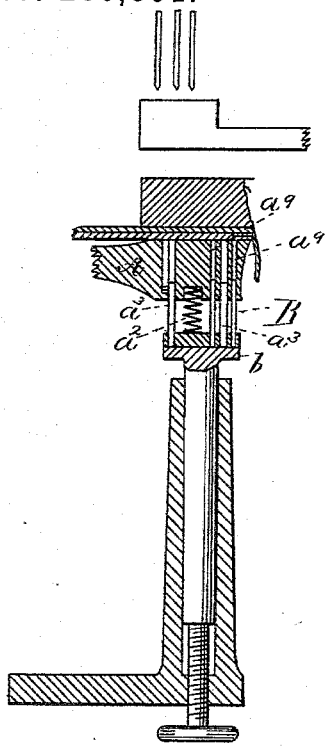
Fig. 1.
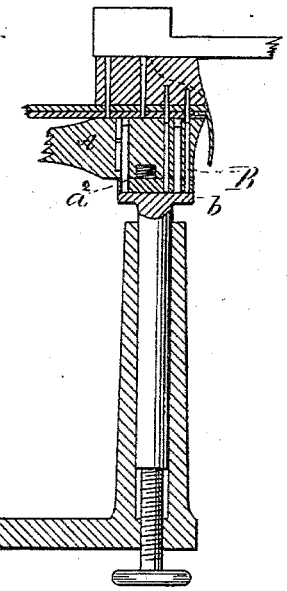
Fig. 2.
Fig. 3.
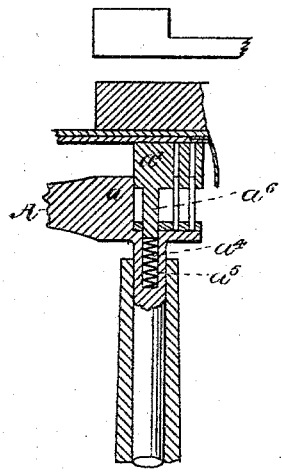
Fig. 4.
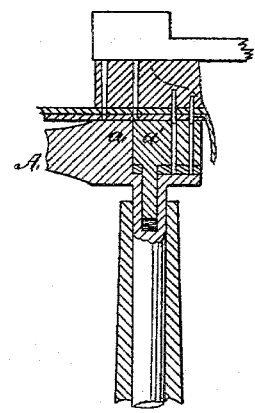
Fig. 5.
Fig. 6.
WITNESSES
Willard C. Fogg.
Fred Harris
INVENTORS
F. F. Raymond 2d
John E. Wheeler

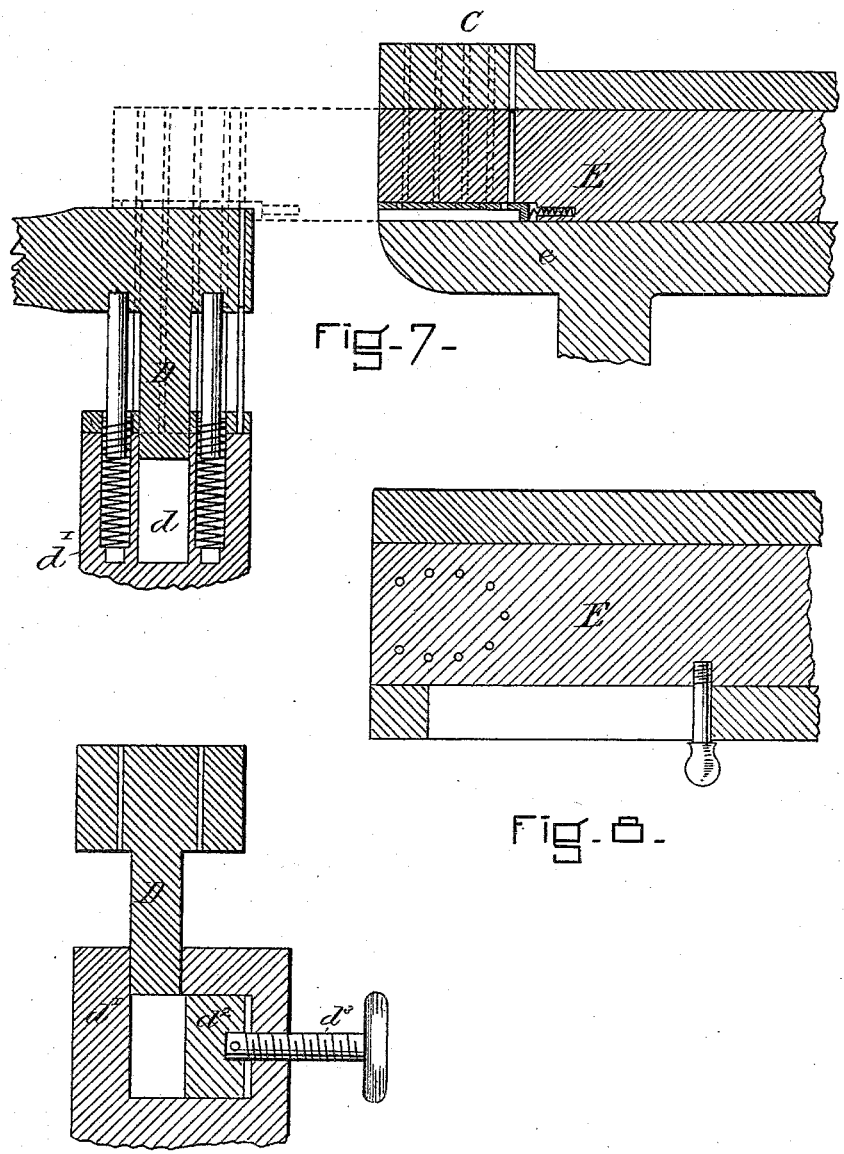

(No Model.) 4 Sheets—Sheet 3.
F. F. RAYMOND, 2d. & J. E. WHEELER.
HEEL NAILING MACHINE.
No. 280,861. Patented July 10, 1883.
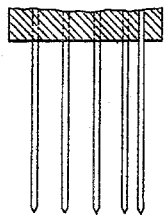
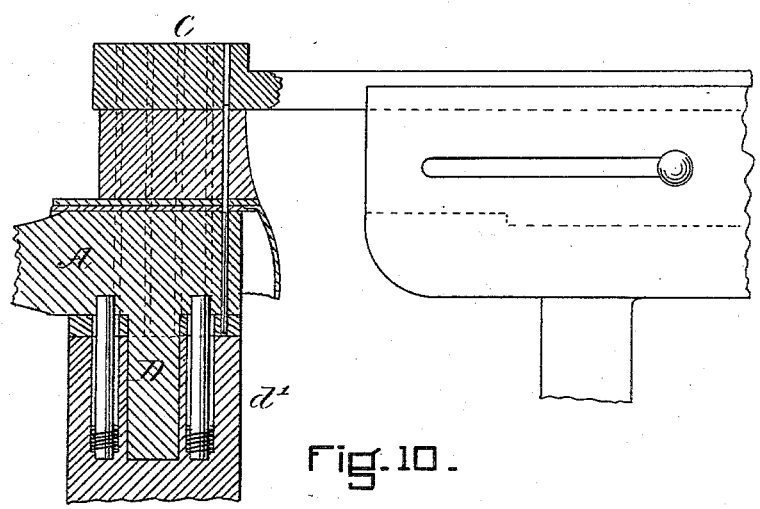
Fig. 10.
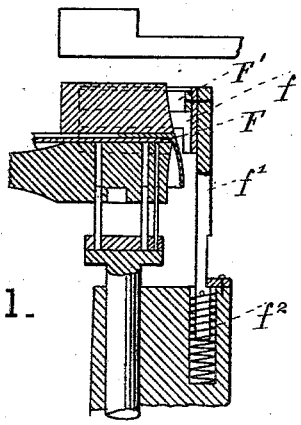
Fig. 11.
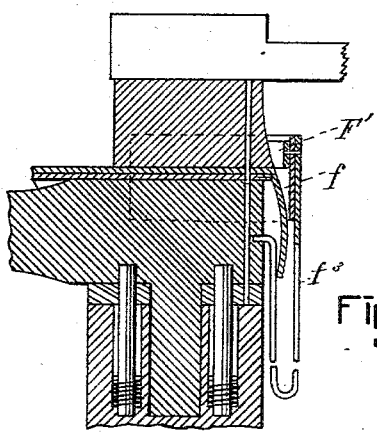
Fig. 12.
WITNESSES
Willard C. Fogg
Fred. Harris
INVENTORS.
F. F. Raymond 2d
John E. Wheeler (No Model.) 4 Sheets—Sheet 4.
F. F. RAYMOND, 2d. & J. E. WHEELER.
HEEL NAILING MACHINE.
No. 280,861. Patented July 10, 1883.

WITNESSES
INVENTORS

UNITED STATES PATENT OFFICE.

FREEBORN F. RAYMOND, 2D, OF NEWTON, AND JOHN E. WHEELER, OF LYNN, MASSACHUSETTS.

HEEL-NAILING MACHINE.

SPECIFICATION forming part of Letters Patent No. 280,861, dated July 10, 1883.

Application filed October 13, 1882. (No model.)

*To all whom it may concern:*

Be it known that we, FREEBORN F. RAYMOND, 2d, of Newton, in the county of Middlesex, and JOHN E. WHEELER, of Lynn, in the county of Essex, both in the State of Massachusetts, citizens of the United States, have invented a certain new and useful Improvement in Heel-Nailing Machines, of which the following is a full, clear, and exact description, reference being had to the accompanying drawings, forming a part of this specification, in explaining its nature, in which—

Figure 1 represents in vertical section the heel-support and templet or pressure plate of a heel-nailing machine. Fig. 2 represents in vertical section the same parts after the nailing operation. Fig. 3 is a plan view of the heel-support. Figs. 4, 5, and 6 show in vertical section and plan a modification in construction. Fig. 7 represents means for feeding nails to the heel-support. Fig. 8 is a plan view of a part of the mechanism therein shown in Fig. 7. Fig. 9 is a vertical section of the heel-support and holding mechanism at right angle to that shown in Fig. 7. Figs. 10, 11, 12 show modification hereinafter described. Fig. 13 represents in side elevation and vertical section the upper portion of a Henderson heel-nailing machine provided with our improvement, and Fig. 14 is a side elevation of a heel-blank, representing in dotted outline the contour of a French or ogee heel when trimmed.

This invention is an improvement upon that described in Letters Patent No. 252,215 and No. 259,687, and it involves certain variations in construction whereby the nailing of the heel is done wholly or in part from the inside of the boot or shoe. This method of nailing is especially desirable for securing ogee or French heels to the soles, because it provides for the fastening of the back end of the heel to the soles, which of course cannot be accomplished by nailing from the outside through the entire heel.

Figs. 1 to 6, inclusive, represent a construction adapted to drive only the nails used for fastening the back portion of the heel to the soles, the remainder of the nails being driven from the outside through the templet-plate in the manner, or substantially in the manner, described in said patents.

In Figs. 7 to 10, inclusive, we show an arrangement whereby all the nails used for fastening the heel are driven from the inside of the shoe. A is the heel-support. It may be made in one piece, as represented in Figs. 1, 7, 9, and 10; or it may be made in the two parts $a$ $a'$, as represented in Figs. 4, 5, and 6, and it or its rear portion is provided with a vertical movement in relation to the drivers B and the driver-holding plate $b$. In Figs. 1, 2, and 3 the entire support A has such vertical movement against the stress of the spring $a^4$, the said spring being confined in a recess, $a^5$, in the stationary part, and a projection, $a^6$, extending downward from the under part of section $a'$, enters the said hole or recess, and serves in part as a guide. In addition to this the portion $a'$ may have the dovetail extension $a^7$, which enters the dovetail slot $a^8$ upon the side of the stationary part $a$. The support A or section $a'$ is provided with the holes $a^9$, into the lower portion of which the drivers B project when at rest, and upon the downward movement of the templet-plate C the relative position of the drivers and support is so changed that the nails which have been inserted into the holes $a^9$ are driven into the heel; or, in other words, the support A or the portion $a'$ is a combined support, templet, and nail-holder. It is a support because it holds the work. It is a templet because it serves to support and guide the drivers, and it is a nail-holder because it serves to hold the nails preparatory to driving; and for this purpose it is made sufficiently thick so that the holes $a^9$ may be long enough to receive the ends of the drivers and the nails, as the nails must not project above the upper surface thereof.

Of course it is immaterial for the purposes of the invention whether the support A or section $a'$ has a downward vertical movement in relation to the stationary drivers, or whether said parts are made stationary and the drivers given a vertical movement in relation thereto. We have represented in detail the first-named construction; but it is perfectly obvious that the last-named construction can be easily carried into effect by giving the driver-plate and drivers a vertical movement upon the standard supporting the heel-support A by means of a cam and suitable connection, or by a crank and link, or by any other ordinary mechanical means for reciprocating the holder. It is equally obvious that all the nails required for securing the heel in place may be driven in this manner, instead of those for securing the back portion of the heel only, and such construction is shown in Figs. 7 to 10, inclusive.

It will be understood, of course, that with the construction shown the templet-plate C has a vertical movement provided it, and is like the templet-plate shown and described in said Letters Patent—or, in other words, that it has a vertical movement in relation to the heel, and that it moves the shoe and support A or section $a'$ downwardly, compressing the heel and causing the nails to be driven from the support or section upwardly through the soles and heel, and at the same time it is used in connection with the hole-forming and nail-driving appliances described in said Letters Patent, or other similar appliances for driving nails from the outside into the main portion of the heel—that is, there may be employed for securing the heel to the soles two sets of mechanism, one of which operates from the inside, substantially as specified, to drive nails into the back end of the heel from within the boot or shoe, and the other of which operates from the outside to drive the nails into the main portions of the heel, as described in said Letters Patent. In case all the nails are driven from the inside, as specified, it may be necessary to form holes from the outside in the main portion of the heel, and in this event the plate C would act as a templet in connection with reciprocating awls such as are described in said Letters Patent, and the awls being operated from the outside form holes through the heel and soles into which the nails are driven from the inside of the shoe. Of course in this event the awls and drivers must be in line with each other, and the support A is locked at its highest position while the awls are driven. For this purpose we prefer the construction shown in Figs. 7 and 9, consisting of the extension or stud D, which enters the hole $d$ in the stand $d'$ and the block $d^2$, which is adapted to be moved by the screw $d^3$ beneath the extension, and practically lock the support when at its highest elevation, and to be withdrawn to permit the templet or pressure plate C to move the support downward. When awls are not used, the plate C need not have holes, and will be a pressure-plate simply.

For feeding the nails into the holes $a^9$ we have represented in Figs. 7, 8, and 10 a nail-holder, E, which is adapted to receive nails and to slide from the table $e$ upon the surface of the support A or section $a'$ and deposit its nails. This may be used, when all the nails are driven from the inside, in lieu of the nail-holder described in said Letters Patent, and instead of being used in connection with the templet-plate therein described it is used in connection with the perforated support A; but of course it may be used in addition to a holder for feeding nails to the upper templet, in which case it would be employed for feeding only those nails which are driven from inside the boot or shoe.

As the heel-support is vertically movable, and as the boot or shoe is placed thereon when at its highest elevation, and as the templet or pressure plate moves vertically downward, and as it is necessary to center the boot or shoe upon the support before it is moved downward, and as it is also desirable to properly locate the heel-blanks before such movement, we have provided the boot and heel guides F F' with a vertical movement, which is substantially coincident with the movement of the support, and may be caused by it or by the downward movement of the templet or pressure plate, as desired.

In Fig. 11 we have represented the heel-centering device F' and the boot or shoe centering device F, secured to the support fastened to the standard $f'$, which rests upon the spring $f^2$, and which is moved downward against the pressure of the spring with the heel-support by the templet or pressure plate in driving the nails.

In Fig. 12 we have represented the heel and boot and shoe centering devices attached to the support A, so as to be moved therewith by means of the goose-neck arm or connection $f^3$.

Of course any suitable guides or centering devices for properly locating or centering the boot or shoe upon the support and the heel upon the outsole may be used, and among others we mention those described in the Henderson Patent, No. 259,687, comprising a curved frame having guide-arms which are adjustable by set-screws to conform to the curve of the boot or shoe, and also to the heel, for it is necessary that the contacting portions of these centering devices should have lateral movement sufficient to enable them to be moved for adjustment to varying sizes; but this movement should be so regulated, especially for the device for centering the boot or shoe upon the support, as to be uniform in relation to the heel-support, as it is necessary that the boot or shoe should be centered as accurately as possible upon the support.

Of course, in lieu of the flat guide-arms F F', (shown in Figs. 11 and 12,) a flat plate with a narrow edge adapted to enter the crease between the outsole and upper, and adjusted in the curved support $f$ by adjusting-screws, may be used.

Any suitable stop may be used for limiting the extent of upward movement of the support A or the portion $a'$ in relation to the stand $d'$.

In case all the nails used for nailing the heel are driven from within the boot or shoe, the plate C need not be perforated unless it is necessary to use awls for forming or partially forming the holes in the heels, in which case it will be desirable to move the templet C after the awls have been operated to form the holes and have been withdrawn out of line with the holes formed by the awls in the heel, in order that the nails may be driven against a solid abutment. When the templet C is employed, as the holes in the templet register with those in the nail-holder, the nails may be dropped through the templet-holes into the nail-holder. This position of the nails and templet is shown in Fig. 7.

It is desirable that the ends of the drivers shall be flush or upon the same level with the surface of the support A when the same has been depressed to its lowest position, in order that the solid abutment may be formed, upon which the nails may be headed by the downward movement of the presser C, and it is desirable that the nails which are driven through the heel to the top-lift shall not taper as much as the ordinary shoe-nail.

The nail-holder E may have the sliding plate described in said Letters Patent, or it may have any other suitable means for preventing the nails from falling therefrom until fed to the proper position to deposit them into the support A.

Of course by changing the fulcrum of the lever the length of stroke of the drivers may be varied.

In Fig. 13 we illustrate the invention as applied to the heel-nailing machine described in the Henderson Patent, No. 259,687, and the position of the work is that which obtains after the support A has been moved downward vertically by means of the presser-plate or templet C, causing the drivers B to drive the nails from the support A into the rear of the heel, and also after the awls have been reciprocated by the cross-head M and the templet C, loaded with nails, and before the upper drivers, N, have been reciprocated.

Having thus fully described our invention, we claim and desire to secure by Letters Patent of the United States—

1. In a heel-nailing machine, the combination of the stationary portion $a$ of the heel-support and movable perforated portion $a'$, all substantially as and for the purposes described.

2. The combination, in a heel-nailing machine, of the support A, having a vertical motion in relation to the drivers, and means for locking it at or near its highest position, all substantially as and for the purposes described.

3. The combination, in a heel-nailing machine, of a perforated heel-support and drivers for driving nails therefrom upwardly from the inside of the boot or shoe into the heel, the templet-plate C, a gang of awls above the templet-plate, adapted to be reciprocated, and in connection with the templet-plate to form holes in line with the drivers B, and to be operated before the drivers are operated, all substantially as and for the purposes described.

4. The combination of the templet or presser C, the perforated heel-support A, and the nail holder and feeder E, arranged below the templet or presser, to feed nails into the holes in the support A, all substantially as and for the purposes described.

5. In a heel-nailing machine, the combination of the perforated heel-support A, the drivers B, and the guides F, adapted to be moved vertically with said support by the templet or presser C, all substantially as and for the purposes described.

6. In a heel-nailing machine, the combination of the vertically-movable templet or presser plate C, the vertically-movable perforated heel-support A, the stationary drivers B, and the guides F F', all substantially as and for the purposes described.

7. In a heel-nailing machine adapted to attach French or ogee heels, the combination of a perforated heel-support adapted to be charged with nails, and provided with a vertical movement in relation to the stationary drivers B, and templet or presser C above the heel-support, adapted to have a vertical movement imparted to it for compressing the heel and vertically moving the heel-support in relation to the drivers B, a gang of awls adapted to be reciprocated after the vertical movement of said templet to prick the heel, a nail-holder for charging the templet with nails, and a gang of reciprocating drivers interchangeable with the awls, and adapted to drive the nails through the templet into the heel, all substantially as and for the purposes described.

8. In a heel-nailing machine, the vertically-movable heel-guide F', substantially as described.

9. In a heel-nailing machine, the combination of the templet or presser plate, the vertically-movable support A, and the guide F, substantially as and for the purposes described.

10. In a heel-nailing machine, the templet or presser plate, the vertically-movable support A, in combination with the guide F, substantially as and for the purposes described.

FREEBORN F. RAYMOND, 2D.
JOHN E. WHEELER.

Witnesses:
BOWDOIN S. PARKER,
FRED. HARRIS.